Oct. 15, 1929.　　　J. C. BLACK　　　1,731,702
APPARATUS FOR TREATING CLAY
Original Filed April 5, 1920
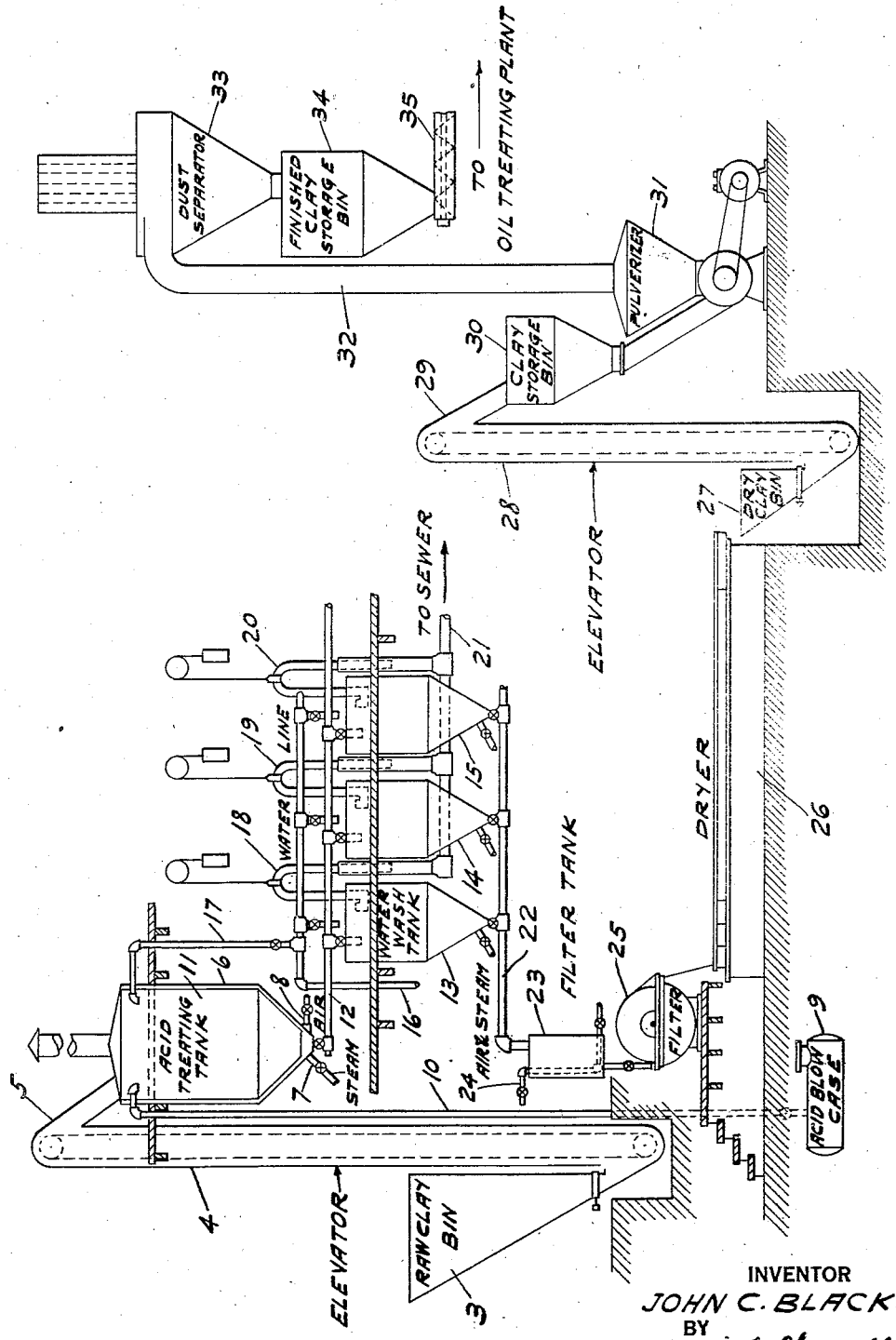
INVENTOR
JOHN C. BLACK.
BY
Marvin L. Chappell
ATTORNEY Patented Oct. 15, 1929

1,731,702

UNITED STATES PATENT OFFICE

JOHN C. BLACK, OF LOS ANGELES, CALIFORNIA, ASSIGNOR, BY MESNE ASSIGNMENTS, TO CONTACT FILTRATION COMPANY, OF SAN FRANCISCO, CALIFORNIA, A CORPORATION OF DELAWARE

APPARATUS FOR TREATING CLAY

Original application filed April 5, 1920, Serial No. 371,399. Divided and this application filed August 2, 1927. Serial No. 210,156.

This invention relates to a new and useful apparatus for treating clays for the purpose of producing a clarifying and decolorizing agent, which may be employed for clarifying and improving the color of petroleum oils; and is a division of the pending application of John C. Black, process of refining oil, filed April 5, 1920, Serial Number 371,399.

At the present time there is a process extensively used for treating petroleum oils consisting in causing the oils to percolate through clay or fuller's earth. The fuller's earth, or clay, may be reclaimed by treatment with sulfuric or hydrochloric acid in combination with other steps.

My invention relates to an apparatus for the treatment of clays to produce the decolorizing agent above referred to, which is to be used for the clarifying and decolorizing of petroleum oils by the process described in my co-pending application, Serial Number 371,399, of which this is a divisional part.

Some clays, such as the well-known fuller's earth found in Florida, do not need an acid treatment to make them commercially profitable, as a filtering agent for oil, although the acid treatment as before stated, is sometimes used on the partially spent clay to more or less restore its filtering qualities. However, there are other clays that show very little filtering qualities, if used as a natural filtering agent, that is, without chemical treatment; but in some cases, these same clays may be treated so as to very materially improve their filtering qualities and even exceed the best natural clay, such as Florida earth.

This invention will be best understood from the following description taken in connection with the accompanying drawing, illustrating diagrammatically, means for carrying out the steps of the process in accordance with the apparatus of this invention. The drawing shows in a general way certain means which may be employed by this apparatus, but the invention is in no way limited to the means shown.

The figure shows the apparatus for completely treating the clay preliminary to its mixture with the oil.

Referring to the drawing, a bin for raw clay is indicated by 3. An elevator 4 lifts the clay from the bin to a chute 5, delivering it to an acid treating tank 6, the latter being preferably lined with lead.

To render the clay more easily and thoroughly acted upon by the chemical reagents employed, it is subdivided as finely as possible. This may be accomplished by agitating the clay in water, which is preferably heated by the use of open steam. The mass is also agitated by the steam, making more thorough the action of subdivision. The agitation may be accelerated by blowing air through the mass. To this end a steam supply pipe 7 equipped with a suitable valve communicates with the tank 6 at its bottom, and a similar air supply pipe 8 with a valve also comunicates with the bottom of the tank. The mass reaches a state approaching a colloidal condition. Sulphuric acid is then added. Hydrochloric acid may be used and possibly other acids, but from a commercial standpoint sulphuric acid best serves the purpose. I prefer to use from one quarter to one half pound of sulphuric acid per pound of clay. These proportions may be varied to suit conditions. A better quality of filtering product may be obtained by the use of a greater quantity of acid than that above specified, but commercial considerations govern this, as the use of more acid reduces the yield of finished product. The optimum yield of finished clay should be obtained by the use of the minimum amount of acid consistent with the maximum yield of filtered oil. These factors have to be determined for each particular clay. The acid that I prefer to use is ordinary 66° Baumé acid, although weaker or stronger acid may be used without materially altering the resulting product. The acid is added to the clay in the tank while in a finely subdivided state. An acid blow case 9 serving as a source of acid supply communicates with the tank through a pipe 10. Water being present in the mass, the acid is very materially diluted. This dilution delays the action of the acid, and it may be hastened by evaporating a portion of the water by any method such as heating to cause evaporation, or by blowing hot air through the mixture, or by the use of a vacuum, or a combination of these means. The method I prefer is to bring the clay and water to a high temperature by the use of open steam, then to maintain as much heat as possible by using a steam jacket and blowing the heated air through the acid and water mixture. This step of the treatment is continued for several hours or until the acid action is complete. It is then ready to be washed with water to remove the sulphates produced by the acid action. These sulphates consist principally of aluminum, magnesium, calcium, and other metals which may be present in the clay. The action of the acid upon the clay is not well-known. It may be one of purification or it may be one due to some chemical changes in the aluminum or silica or of their combination, or it may alter the clay physically. Whatever the action is, the change is a profound one, as the clay has taken on properties both physical and chemical that it did not previously have. The treatment which I employ comprises not merely the disintegration of some of the constituent parts and the dissolving of other parts of the clay, but is an action upon the clay, whereby the product as a whole is different from the raw clay. The treatment of the clay may be aptly termed digestion.

A discharge pipe 12 leads from the bottom of the tank 6 and has a number of branches controlled by valves for discharging the clay into water washing tanks indicated by 13, 14 and 15. A water line 16 has a discharge pipe to supply water to each of the washing tanks, and a branch 17 to supply water to the acid treating tank. Disposed in each of the wash tanks are siphons 18, 19 and 20, connected to a pipe 21 leading to a sewer or other point for wasting the wash water.

Water is first admitted to the acid treating tank through pipe 17. This dilutes the mass in the tank, which, after the action of the acid has taken on a gelatinous appearance. The dilution is sufficient to cause it to flow and the water also serves to wash the clay.

The washing operation with water is continued in the washing tanks 13, 14 and 15, until the clay is practically free from the sulphates. The wash water is extracted in the apparatus illustrated by means of settling and decantation. However, any suitable method for separating the wash water from the clay may be used, such as any of the well-known methods of mechanical filtration.

After the clay is thickened by settling, it is filtered by any of the well-known filter machines or presses. The thickened clay is conducted from the wash tanks by a pipe 22 leading to a supply tank 23, through which passes a steam line 24 for the purpose of heating the mass, thereby accelerating the filtering action. The clay passes from the supply tank to a mechanical filter 25 and is delivered therefrom to a drying table 26.

The drying table may consist of a hot plate and a reciprocating conveyer for moving the clay across the top. During this operation the clay is dried to bone-dryness at a low heat not sufficient to cause decomposition. This point should not exceed around 300 degrees Fahrenheit; an excellent result may be had by not exceeding 225° Fahrenheit or just sufficient to cause evaporation of the free water. The clay as it passes from the table is in the form of dry cakes or lumps. In this form it is delivered to a dry clay bin 27, from which it is delivered by an elevator 28 to a chute 29 leading to a storage bin 30. From the storage bin the clay passes to a pulverizer 31. In this pulverizer it is ground to as fine a state as practically possible. The pulverized clay is blown through a pipe 32 to a separator 33, which may be of the well-known cyclone type. The finished clay is then delivered to a storage bin 34, the latter being an air tight container, as the quality of the clay will deteriorate by exposure to the air.

The clay is now in condition to be used as a clarifying and decolorizing agent for mineral oils.

What I claim is:

1. An apparatus for the production of a clarifying and decolorizing agent comprising, an acid treating tank, means for introducing solids in lump form into the acid treating tank, separate means for introducing water and acid into the acid treating tank, means for heating and agitating the contents in said acid treating tank, means for withdrawing the contents from the acid treating into any one of a plurality of water wash tanks, means for introducing water into any one of the plurality of water wash tanks, means for agitating and heating the contents of any one of the water wash tanks, siphon means for withdrawing liquids from any one of the water wash tanks, means for withdrawing the contents from the water wash tanks into a receiver heated with steam, means for conveying the heated fluid contents from the receiver into a filter provided with means for separating the major part of the liquid from a solid, and means for drying, pulverizing and collecting said solid.

2. An apparatus for treating clay, comprising, an acid treating tank lined with an acid resisting metal, and a conveyor means for introducing clay into the acid treating tank, separate means for introducing water and acid into the acid treating tank, means for heating and agitating the clay, water, and acid contents in the said acid treating tank, means for withdrawing the contents from the acid treating tank into any one of a plurality of water wash tanks, means for introducing water into any one of the water wash tanks, means for agitating and heating the contents of any one of the water wash tanks, siphon means for withdrawing supernatant liquid from any one of the wash tanks, means for withdrawing the contents from the water wash tank into a receiver provided with heating means, means for conveying the heated fluid contents from the receiver through a filter provided with means for separating the major portion of liquid content from the solid content, and means for drying, pulverizing and collecting said solid content.

3. An apparatus for the manufacture of a clarifying and decolorizing agent, comprising, a lead lined receptacle, means for introducing clay into said receptacle, separate means for introducing water and acid into the receptacle, means for heating, agitating and digesting the clay, water and acid contents in the receptacle, means for withdrawing the contents from the receptacle into any one of a plurality of water wash tanks, means for introducing water into any one of the water wash tanks, means for agitating and heating the contents of any one of the water wash tanks, siphon means for withdrawing water from any one of the water wash tanks, means for withdrawing the contents from the water wash tanks into a receiver provided with heating means, means for conveying the heated fluid contents from the receiver through a rotary filter provided with means for separating the major portion of the liquid contents from the solid constituents, and means for drying, pulverizing, and collecting said solid constituents.

4. An apparatus for treating clay, comprising, a lead lined acid treating tank, conveyor means for introducing clay into the acid treating tank, means for introducing water into the acid treating tank, means for heating and agitating the clay and water in the acid treating tank, means for introducing acid into the acid treating tank, means for commingling, heating and digesting the clay, water and acid in the acid treating tank, means for withdrawing the contents from the acid treating tank into any one of a plurality of wash tanks, means for introducing water into any one of the plurality of water wash tanks, means for agitating and heating the contents of the water wash tanks, means for withdrawing supernatant water content from the water wash tanks, means for withdrawing the contents from the wash tanks into a receiver heated by means of a closed steam coil, means for conveying the heated contents from the receiver into a filter provided with means for separating the major part of the water from the acid treated washed clay, and means for drying, pulverizing and collecting said acid treated washed clay.

In testimony whereof I affix my signature.
JOHN C. BLACK.